United States Patent [19]

Camarota

[11] Patent Number: 5,588,908
[45] Date of Patent: Dec. 31, 1996

[54] VENTILATION HOSE MOUNTING ASSEMBLY

[75] Inventor: Richard J. Camarota, Holland, Mich.

[73] Assignee: ITC, Incorporated, Holland, Mich.

[21] Appl. No.: 546,376

[22] Filed: Oct. 20, 1995

[51] Int. Cl.$^6$ .................... F23J 11/02; B60H 1/26
[52] U.S. Cl. .................. 454/78; 454/2; 454/367; 285/189; 285/331
[58] Field of Search .................. 454/2, 78, 79, 454/80, 143, 151, 162, 164, 165, 270, 271, 275, 276, 277, 367, 903; 285/162, 189, 194, 331, 924

[56] References Cited

U.S. PATENT DOCUMENTS

| | | | |
|---|---|---|---|
| 3,455,579 | 7/1969 | Olliff, Jr. et al. | 285/331 X |
| 4,050,363 | 9/1977 | Fuerst | 454/76 |

FOREIGN PATENT DOCUMENTS

| | | | |
|---|---|---|---|
| 0214819 | 3/1987 | European Pat. Off. | 285/331 |
| 91827 | 3/1938 | Sweden | 285/189 |

*Primary Examiner*—Harold Joyce
*Attorney, Agent, or Firm*—Flynn, Thiel, Boutell & Tanis, P.C.

[57] ABSTRACT

A fitting for securing a hose to a port formed in a support panel. The fitting includes a face plate that is fitted over the port. A set of spaced apart lock tabs extend inwardly from the face plate. A set of fingers also extend inwardly from the face plate. The fingers are located adjacent to and diametrically outwardly from interstitial gaps between the lock tabs. The hose is secured around the lock tabs and in the interstitial gaps. When the hose-and-fitting assembly is secured in a port, the fingers both lock the fitting in position and compression secure the hose to the fitting.

13 Claims, 5 Drawing Sheets

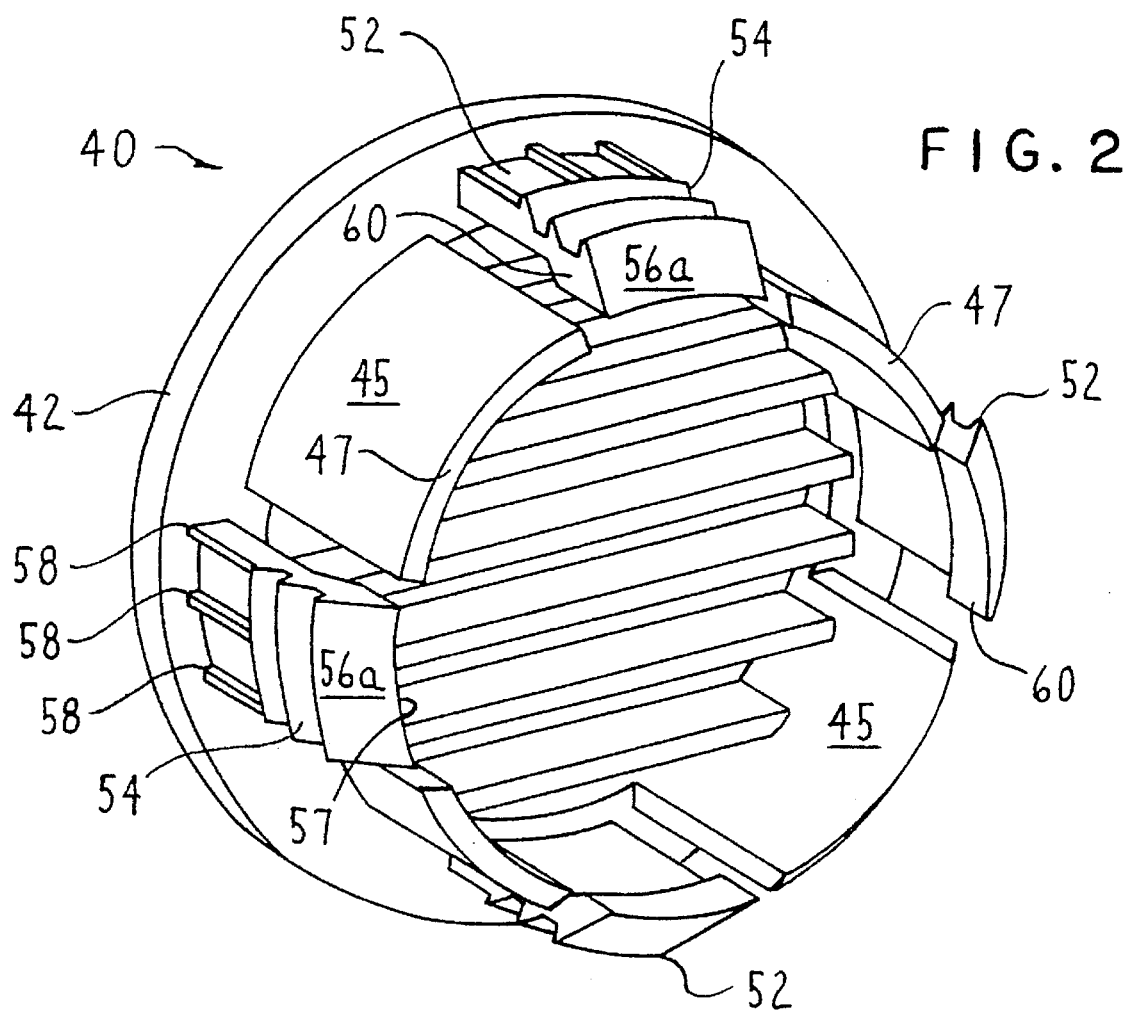

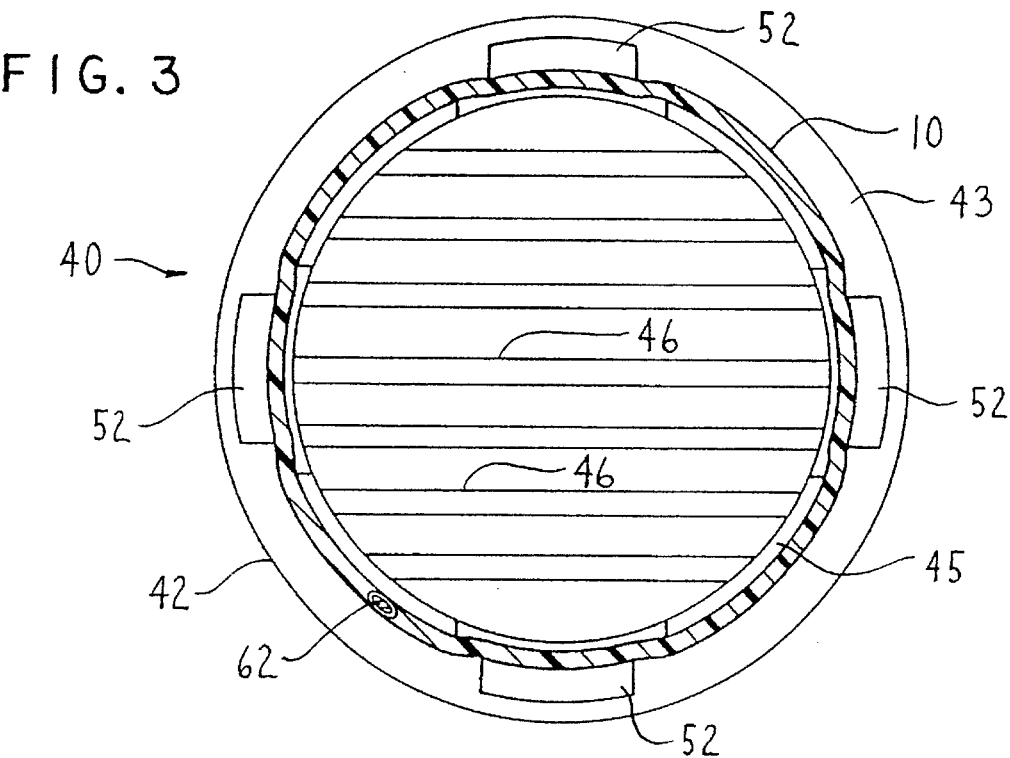
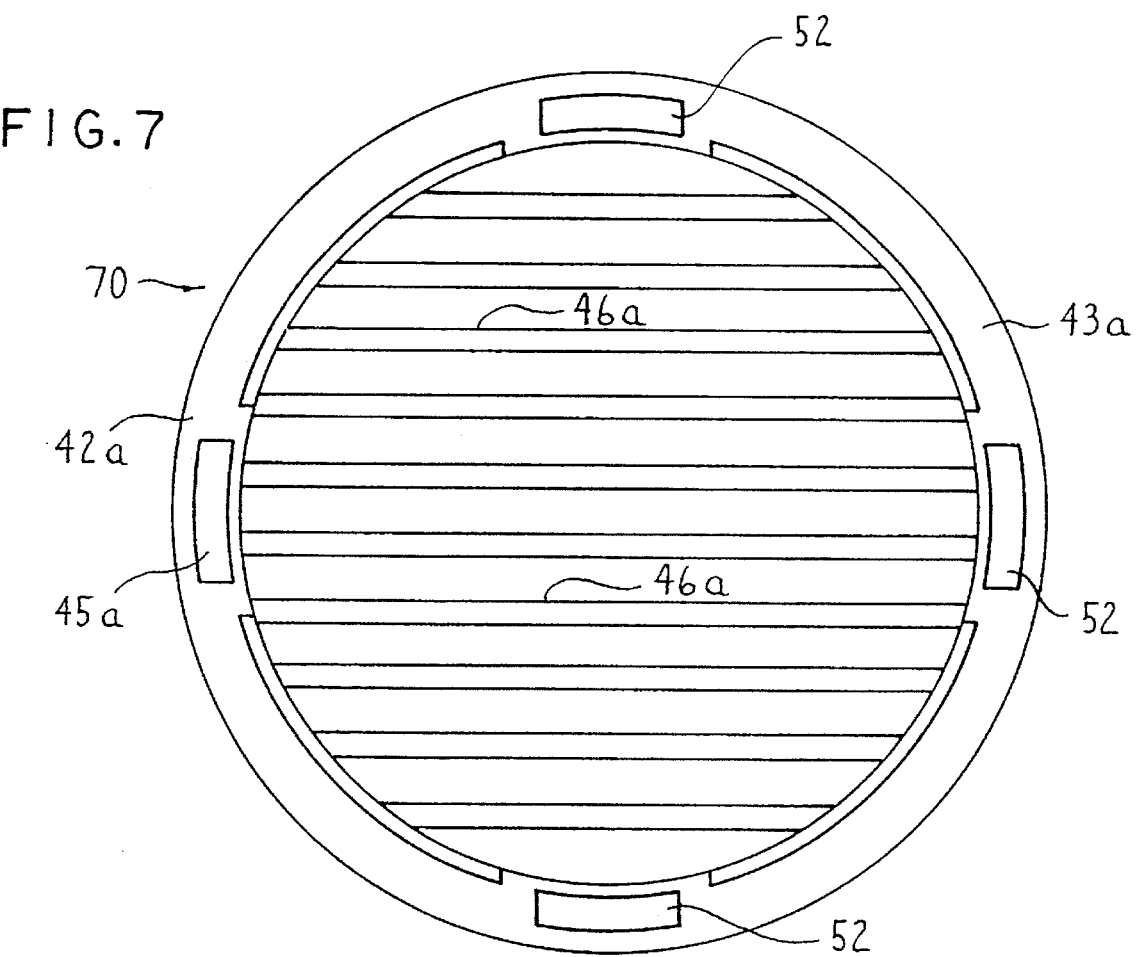

VENTILATION HOSE MOUNTING ASSEMBLY

FIELD OF THE INVENTION

This invention relates generally to an assembly for mounting a hose to an opening formed in a wall or other support panel and, more particularly, to an assembly for mounting a ventilation hose to a panel found in a land or water craft.

BACKGROUND OF THE INVENTION

Many fixed and mobile structures are provided with one or more hoses that serve as conduits for air and other gases that are either exhausted from or vented into a particular space or compartment. As represented diagrammatically by FIG. 1, often a hose 10 is coupled to a structural element such as a wall or panel 12 so as to be mated with an opening 14 formed in the panel. For example, watercraft are often provided with a hose 10 through which gases from the engine compartment are vented to the outside and a second hose 10 through which cooking odor-laden gases are vented from the galley. In a watercraft, the hoses 10 are coupled to openings 14 formed in the hull or other structural member above the craft's water line. Thus, dangerous and unpleasant gases generated in these compartments can be vented away from the craft's occupied spaces.

Typically, a fitting such as the fitting 16 illustrated in FIG. 1A, is used to hold a hose 10 in position around the panel opening 14. Fitting 16 includes an elongated sleeve-shaped central body 18 that extends through the panel opening 14 and into an interior space. Fitting 16 further includes a flat annular flange 20 located around the outer edge of body 18. Threaded fasteners 22 extend through openings formed in the fitting flange 20 and complimentary bores 23 in the panel 14 so as to hold the fitting in place. In many fittings, the stem ends of the fasteners are fitted through an annular ring 26 located around the fitting body 18 adjacent the inside surface of the panel 12. When the threaded fasteners 22 are locked in place, the fitting flange 20 and ring 26 cooperate to compression secure fitting in the port 14. The hose 10 is secured around the inside, open end of the fitting body 18. In the depicted version of the invention, a hose clamp 28 is used to hold the hose in place.

Fittings currently employed to secure a hose to a complementary port have proved sufficient for their purpose. However, a disadvantage of many current fittings is that they are difficult to install. For example, in order to install the fitting 16 depicted in FIG. 1A it is necessary to not only remove a section of the panel 12 in order to form the port 14, it is also necessary to form the bores 23 in the panel for the threaded fasteners. Moreover, many times the act of securing the ring 26 around the fitting body 18 has proved to be a two person job; one person is needed to hold the threaded fasteners so they project into the interior space, while the second person fits the ring over the fasteners and secures the fasteners in place. Moreover, as can be seen by this FIG. 1A, these fixtures require numerous fasteners and a hose clamp. Accordingly, while currently available hose fittings provide an excellent job of securing the hoses which they are associated in place, they have proved to be both relatively expensive to provide and require a significant amount of labor in order to install.

SUMMARY OF THE INVENTION

This invention relates to a hose-and-fitting assembly and to a fitting for trimming or mounting a hose to an opening in a panel and to such a fitting that is both economical to fabricate and relatively easy to install.

BRIEF DESCRIPTION OF THE DRAWINGS

This invention is pointed out with particularity in the claims. The above and further advantages of the invention may be understood by referring to the following description taken in conjunction with the accompanying drawings, in which:

FIG. 2 is a rear pictorial view of the fitting of this invention;

FIG. 3 is a rear plan view of the fitting assembly of this invention;

FIG. 7 is a view similar to FIG. 3, but of a larger diameter fitting assembly of this invention.

DETAILED DESCRIPTION

Figure 4:
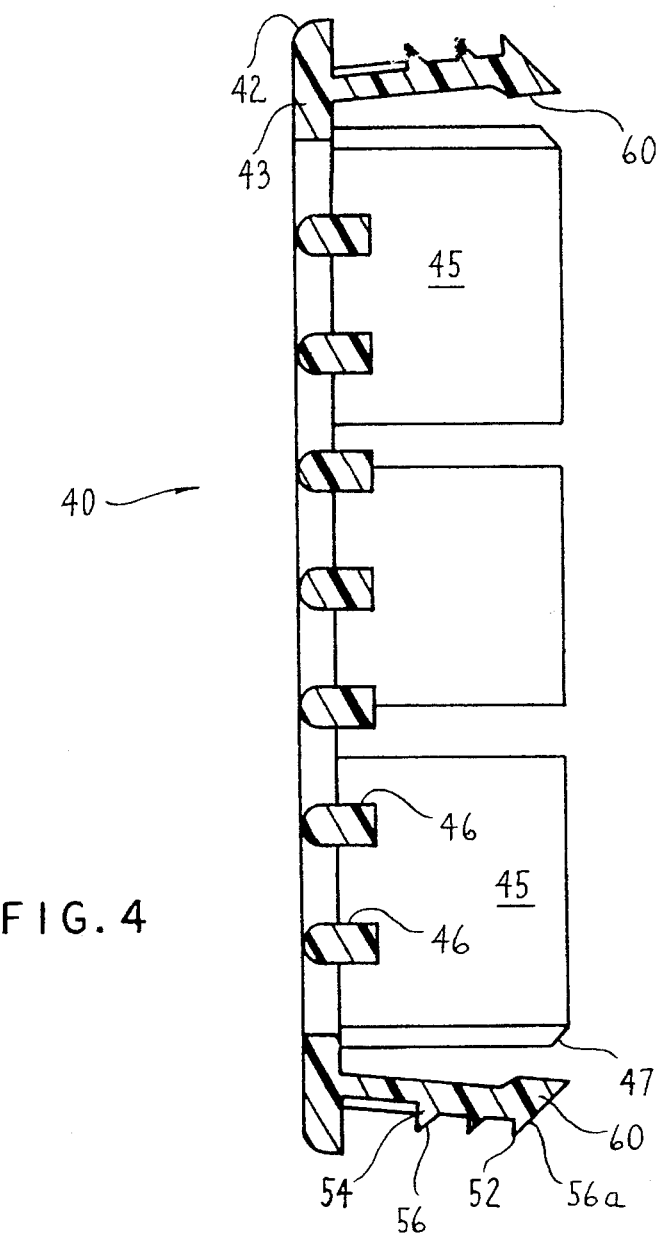
FIG. 4 is a cross-sectional view of the fitting of this invention illustrating how the locking tabs flex.

FIGS. 2, 3 and 4 illustrate a basic hose fitting 40 of this invention. The fitting 40 is formed out of a single piece of material that is shaped to include an annular (here circular) face plate 42 that fits over the complimentary opening 14 in which the fitting is seated. In preferred versions of the invention, the fitting 40 is formed out of a molded plastic such as nylon or polypropylene. Face plate 42 includes a flat circular frame 43 located around the port 14 and a set of parallel spaced apart frame members 46 that extend across the frame. Integral with the fitting face plate 42 are a set of four projecting, spaced apart lock tabs 45. Each lock tab 45 has an arcuate cross-sectional profile. The lock tabs 45 are further formed so that the top portions thereof have inwardly beveled surfaces 47.

Also integral with fitting face plate 42 is a set of four locking fingers 52 each of which is located between an adjacent pair of lock tabs 45. Each finger 52 has a generally arcuate cross-sectional profile. Fingers 52, like tabs 45, extend rearward from the back of the face plate frame 43. The fingers are, however, positioned so as to be located slightly outward from the arcuate interstitial gaps between the adjacent lock tabs 46. Each finger 52 is further shaped to have three outwardly extending teeth 54 that extend beyond the outer surface of the finger. Teeth 54 extend the width of each finger and are formed with inwardly tapered top surfaces 56. The top surface 56a of the upper most tooth 54 forms the top surface of the finger 52. In the depicted version of the invention, small reinforcing webs 58 formed integrally with the each finger 52 extend between the bottom-most tooth and the adjacent inside surface of the circular face plate 42.

Each finger 52 is further formed with an inwardly extending lip 60 adjacent the top end of the finger. The lips 60 extend across the width of the fingers with which they are integral. The lips 60 extend toward but not subtend the arcuate interstitial gaps between the lock tabs 45.

Figure 5:
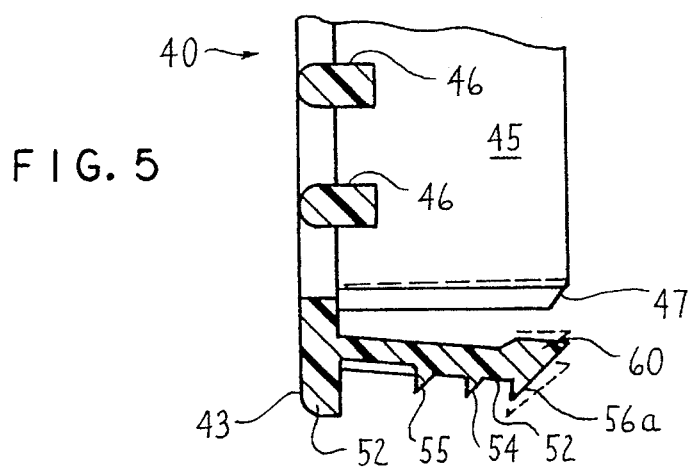
FIG. 5 is a detailed view of FIG. 4 illustrating the movement of a single locking tab.

In some preferred versions of the invention, the fitting 40 is constructed so that lock tabs 45 have an outside diameter that is between 0.125 and 0.250 inches less than the diameter of the associated port 14 and the fingers 52 define an outside diameter between 0.125 and 0.188 inches greater than the diameter of the port. The actual range will of course vary with such factors as the size of the port and the wall thickness of the hose 10. Also, as discussed hereinafter, to ensure that the hose 10 can be coupled to the fitting 40, as shown in FIGS. 4 and 5, the fingers are further constructed so that they can be slightly pivoted around the lines to which they are attached to the fitting face plate 42.

The hose fitting 40 of this invention is employed by first passing the hose 10 to which the fitting is coupled through the associated port 14. In preferred assemblies employing fitting 40, the hose 10 is formed of flexible material in which a coiled wire 64 is embedded in order to provided the hose with reinforcing support. Such hose is commonly formed of thin metal foil and is further constructed so that the position of the wire coil 64 is clearly detectable by both sight and feel.

Figure 1:
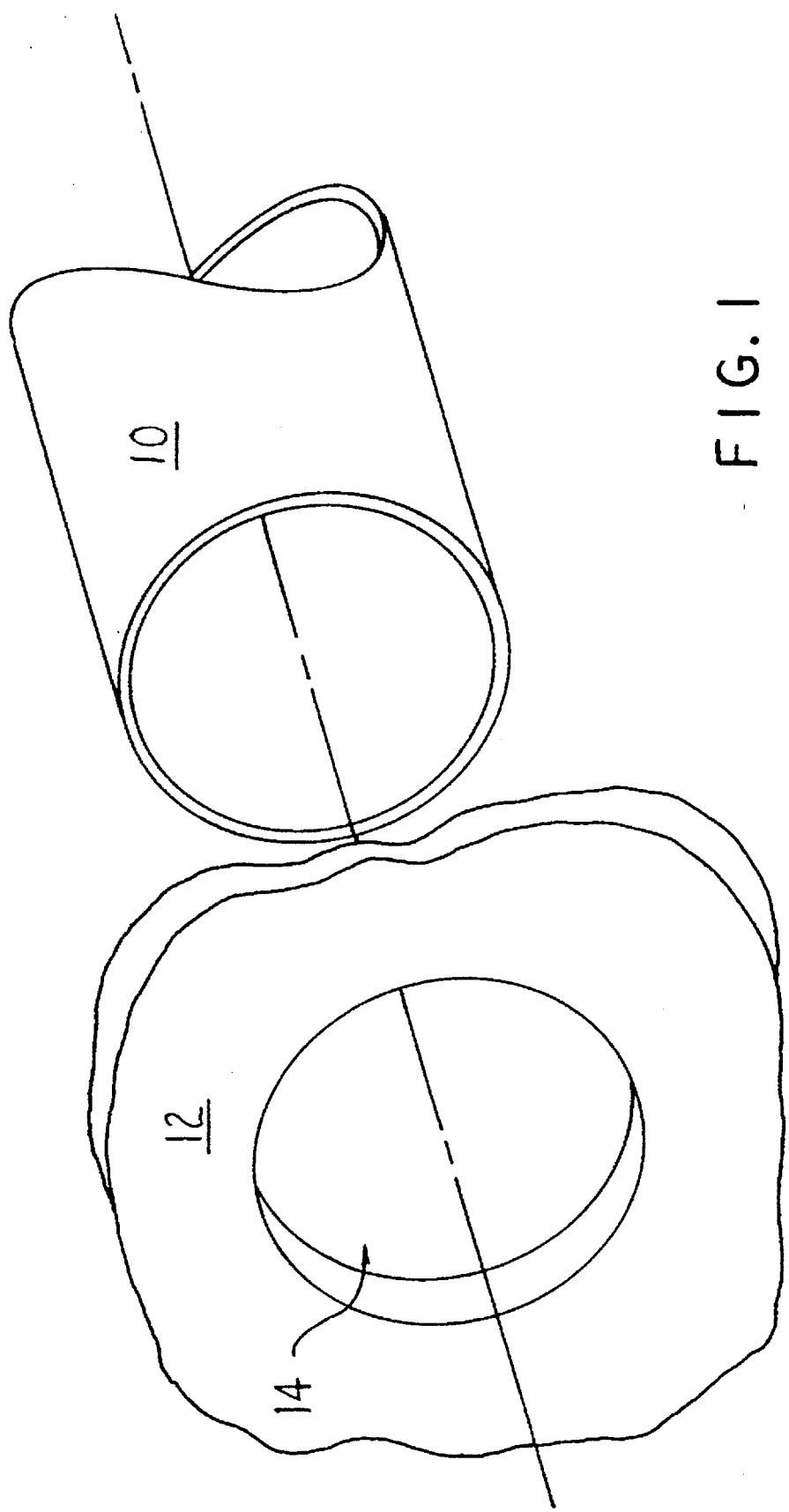
FIG. 1 is a diagrammatic representation of a structural environment which is desirable to couple a hose with a port formed in a structural panel.
Figure 1A:
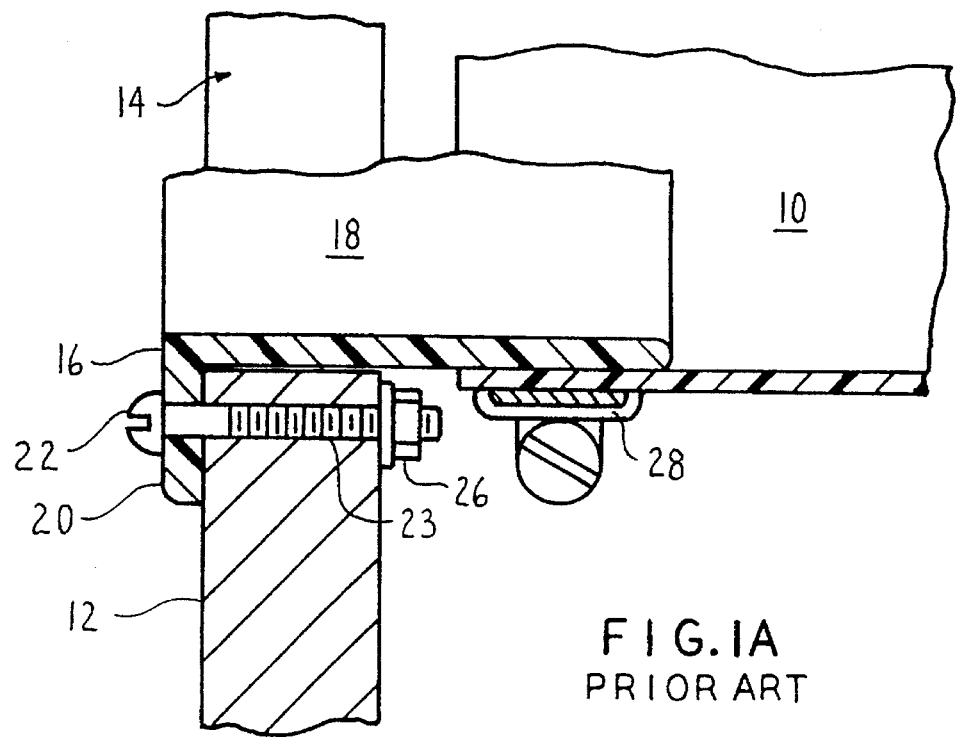
FIG. 1A is a cross-sectional view illustrating how a prior art fitting is used to secure a hose to a port formed in a panel.
Figure 6:
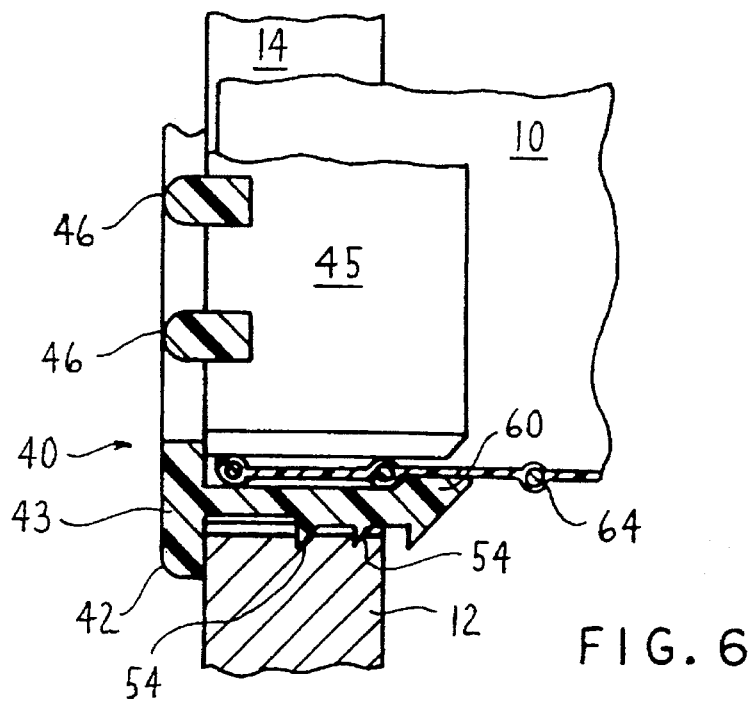
FIG. 6 is a cross-sectional view illustrating how a hose is secured to a panel port according to this invention.

After the hose 10 is inserted through the port 14, the open end thereof is coupled over the fitting as depicted in FIGS. 3 and 6. Specifically, the hose is positioned so that it is located outside the outer surfaces of the lock tabs 45 and inside the inner surfaces of the fingers 52. Moreover, the hose is further positioned so that its end portion and the end portion of the wire coil 64 are located in the space between the inside surface of the face plate and the finger lips 60.

Once the hose 10 is thus secured to the fitting 40, the assembly may be fitted in the port 14. When the fitting is inserted into the port 14, the fingers 52 bend resiliently inward at a slight angle. This bending of the fingers 52 accomplishes two functions. Firstly, this movement serves to lock the hose 10, and in particular the wire coil 64 integral with the hose, between the fingers 52 and the lock tabs 45. Secondly, the inward bending of the fingers 52 causes the fingers to develop an outwardly-directed bias so that they are resiliently urged against the adjacent surface of the panel 12 that forms the port 14. This bias causes the teeth 54 integral with the finger to bear into the panel 12 to lock the fitting 40 in place on the panel.

Fitting 40 of the hose-and-fitting assembly of this invention is a single-piece unit. Neither the fitting's installation to the associated panel 40 nor the hose's coupling to the fitting require additional fastening elements. A single person can both couple the hose 10 to the fitting 40 and then mount the hose-and-fitting assembly to the associated panel 12. Moreover, there is no need to cut auxiliary holes in the panel for fasteners to facilitate the securement of the fitting 40. Still another feature of this fitting 40 is that when it is used with a hose 10 formed of relatively rigid material or provided with a reinforcing wire core 64, the hose or the reinforcing wire prevents the fingers 52 from excessively inwardly pivoting. This increases the outward bias of the fingers 52 when the fitting 40 is placed in the port 14 so as to maximize the compression fit of the fitting in the port. Thus, the hose-and-fitting assembly of this invention provides a convenient means for securing a hose to an outlet port. In addition, the fitting 40 provides a finished appearance to irregular or rough cut panel openings 14.

FIG. 7 illustrates an alternative fitting 70 of this invention. Functionally and structurally, fitting 70 is a larger diameter version of previously described fitting 40. It will, however be noted that fingers 52 of fitting 70 are of the same size as the fingers 52 of fitting 40. This relationship illustrates another advantage of the fitting of this invention; that, with proper dimensioning, the same size fingers 52 can be used to both securely couple the hose to the fitting and mate the fitting to a panel for fittings of significantly varying diameter. An advantage of this feature of the invention is that it reduces the costs of making the molds needed to fabricate different sized fittings.

It should be understood that the foregoing is for the purposes of illustration only and alternative embodiments of this invention are possible without departing from the scope of the claims. For example, while the illustrated versions are shown as having face plate 42 with a circular profile, in other versions of the invention the outward shape of the fitting may be different. For example, the face plate may be square. Also, while the invention as described includes four lock tabs 45 and four fingers 52, other versions of the invention may be provided with fewer or more of these components. Moreover, while it is desirable to employ hoses with wire cores 64 in this invention, it is not required. In other versions, it may, for example, be desirable to provide hoses with openings in which the complementary finger lips 60 are seated. In addition, with or without a corresponding hose, fittings 40 and 70 act as trim rings to attractively dress a panel opening 14 and thereby improve its appearance.

Thus, although particular preferred embodiments of the invention have been disclosed in detail for illustrative purposes, it will be recognized that variations or modifications of the disclosed apparatus, include the rearrangement of parts, lie within the scope of the invention.

The embodiments of the invention in which an exclusive property or privilege is claimed are defined as follows:

1. A hose-and-fitting assembly adapted to be secured to a port formed in a panel, said assembly comprising:

a fitting including: a face plate; a set of spaced apart lock tabs that extend inwardly from said face plate, said lock tabs being dimensioned to subtend the outer perimeter of the port and being spaced apart to define interstitial gaps; and a set of fingers that extend inwardly from said face plate, said fingers being located adjacent to and diametrically outwardly spaced from said lock tab interstitial gaps and being formed with fastening elements configured to be secured to portions of the panel forming the port; and a hose fitted over outside surfaces of said lock tabs and in said lock tab interstitial gaps so that when said fitting is secured in the port, said hose is compression secured to said fitting by said fingers.

2. The hose-and-fitting assembly of claim 1, wherein said fingers have end sections and said fingers are formed with inwardly directed lips at said end sections that bear against said hose.

3. The hose-and-fitting assembly of claim 2, wherein said hose is provided with a reinforcing wire and said hose is fitted to said fitting so that portions of said reinforcing wire are secured between said fitting face plate and said fitting finger lips.

4. The hose-and-fitting assembly of claim 2, wherein said fitting finger fastening elements are outwardly directed teeth integrally formed with said finger, said teeth being dimensioned to bear into the portion of the panel forming the port.

5. The hose-and-fitting assembly of claim 1, wherein said fitting finger fastening elements are outwardly directed teeth integrally formed with said finger, said teeth being dimensioned to bear into the portion of the panel forming the port.

6. The hose-and-fitting assembly of claim 1, wherein said fitting is provided with four lock tabs and four fingers.

7. The hose-and-fitting assembly of claim 1, wherein said face plate has a circular profile.

8. A fitting for securing a hose to a port formed in a panel, said fitting including:

a face plate having a center point;

a set of spaced apart lock tabs that extend inwardly from said face plate, said lock tabs having a common arcuate shape and being centered around said face plate center point and being positioned to subtend the outer perimeter of the port and to define interstitial gaps between said tabs; and a set of fingers that extend inwardly from said face plate, said fingers being located adjacent to and diametrically outwardly spaced from said lock tab interstitial gaps so that the hose can be fitted over said lock tabs and in said interstitial gap and being formed with fastening elements configured to be secured to the portion of the panel forming the port and being pivotally secured to said face plate, so that when said fitting and the hose are seated in the port, said fingers will pivot inwardly to secure the hose in the interstitial lock tab gaps and said finger fastening elements will bear against the panel so as to secure the fitting in place.

9. The fitting of claim 8, wherein said fingers have end sections and said fingers are formed with inwardly directed tabs at said end sections that bear against the hose.

10. The fitting of claim 9, wherein said fitting finger fastening elements are outwardly directed teeth integrally formed with said finger, said teeth being dimensioned to bear into the portion of the panel forming the port.

11. The fitting of claim 8, wherein said fitting finger fastening elements are outwardly directed teeth integrally formed with said finger, said teeth being dimensioned to bear into the portion of the panel forming the port.

12. The fitting of claim 8, wherein said fitting is provided with four lock tabs and four fingers.

13. The fitting of claim 8, wherein said face plate has a circular profile.

* * * * *